May 31, 1966  O. E. DUEMLER  3,253,518
PISTON OPERATOR
Filed March 2, 1964  7 Sheets-Sheet 3
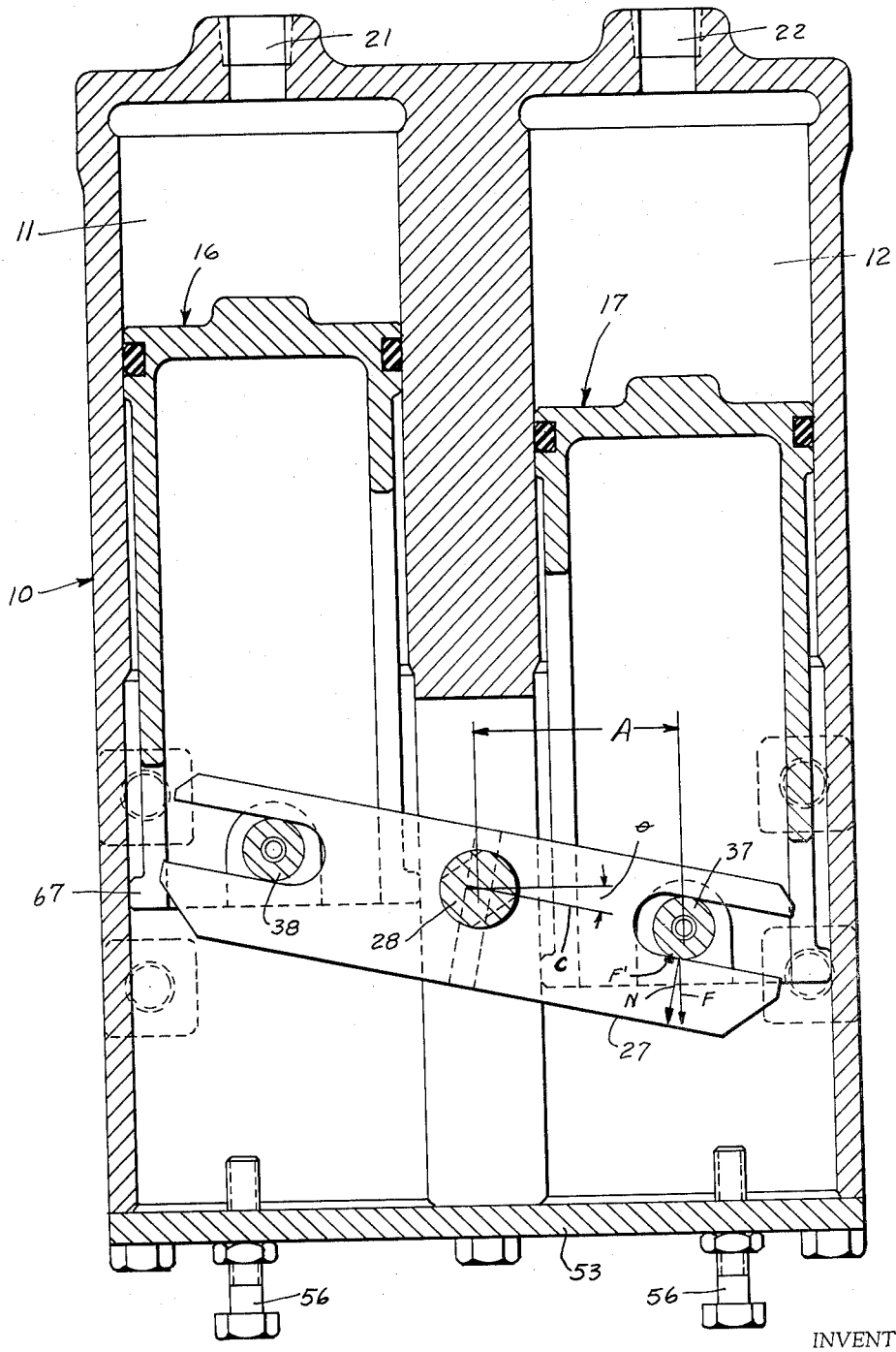
FIG-3-
INVENTOR.
OLIVER EVANS DUEMLER
BY Edward B. Gregg
ATTORNEY

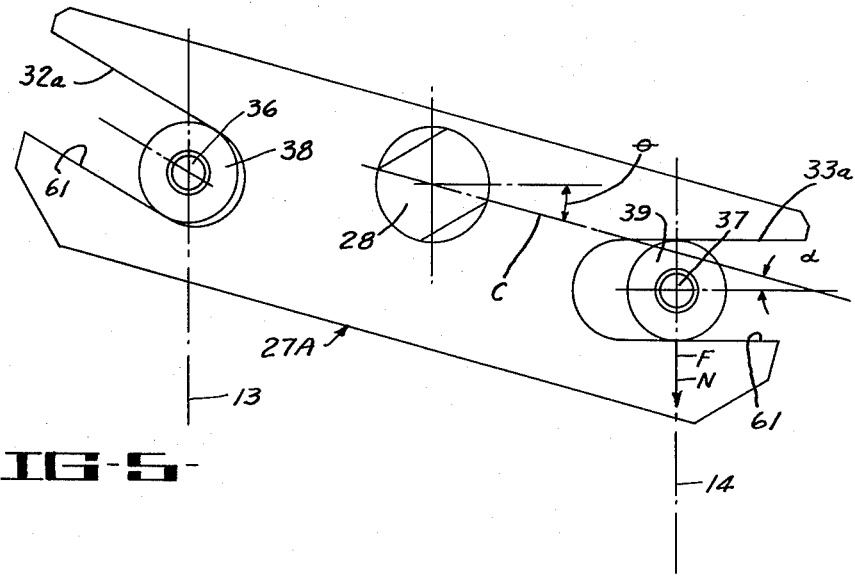
FIG-5-
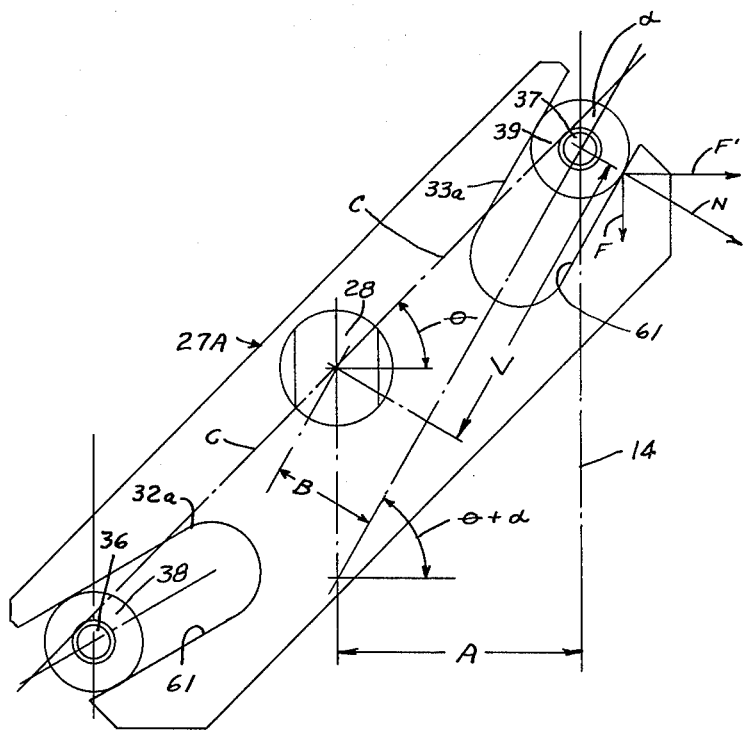
FIG-4-
INVENTOR.
OLIVER EVANS DUEMLER
BY Edward B. Gregg
ATTORNEY May 31, 1966   O. E. DUEMLER   3,253,518
PISTON OPERATOR
Filed March 2, 1964   7 Sheets-Sheet 5
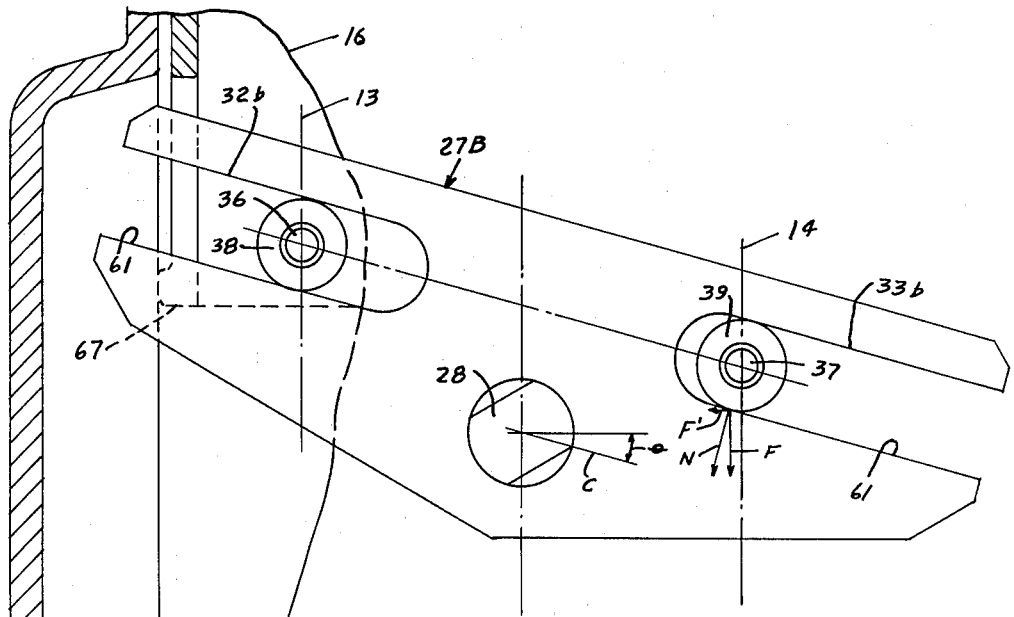
FIG-7-
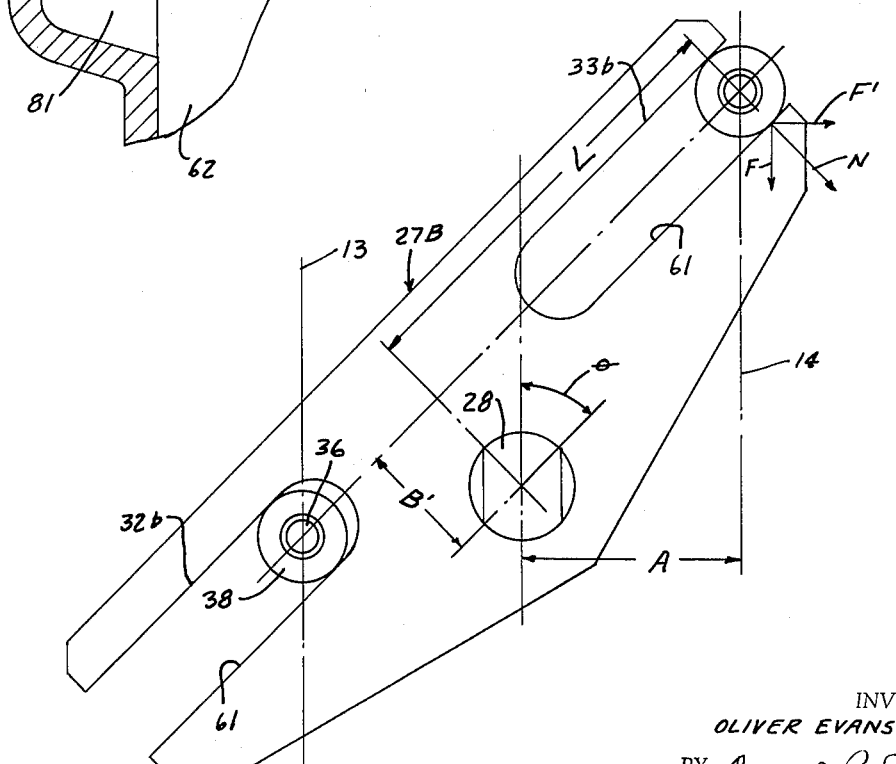
FIG-6-
INVENTOR.
OLIVER EVANS DUEMLER
BY Edward B Gregg
ATTORNEY May 31, 1966  O. E. DUEMLER  3,253,518
PISTON OPERATOR
Filed March 2, 1964  7 Sheets-Sheet 6
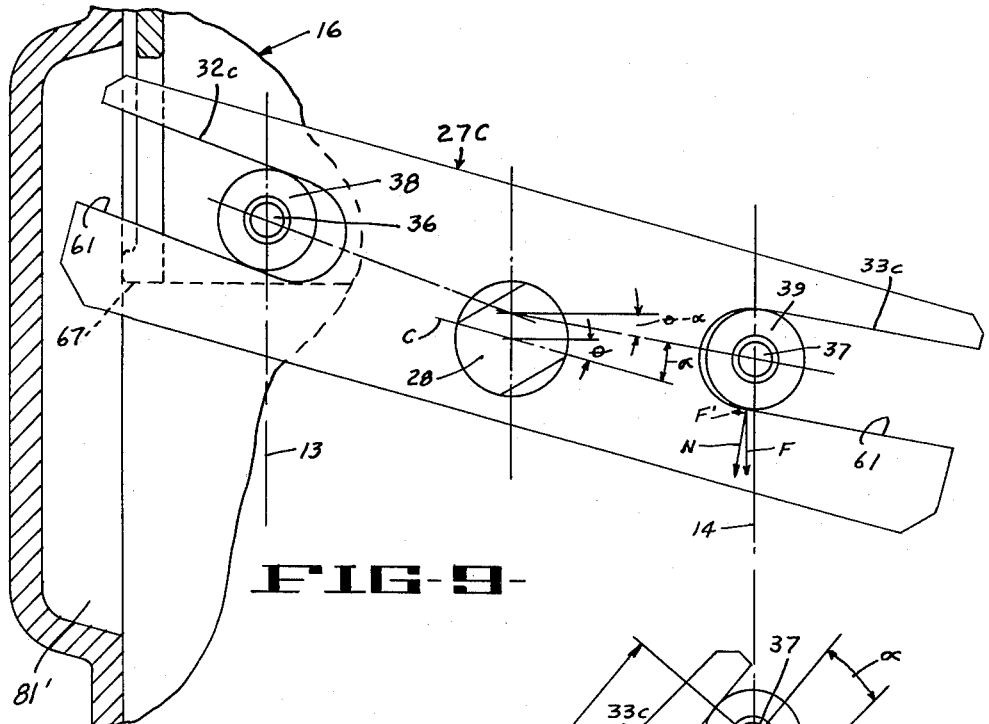
FIG-9-
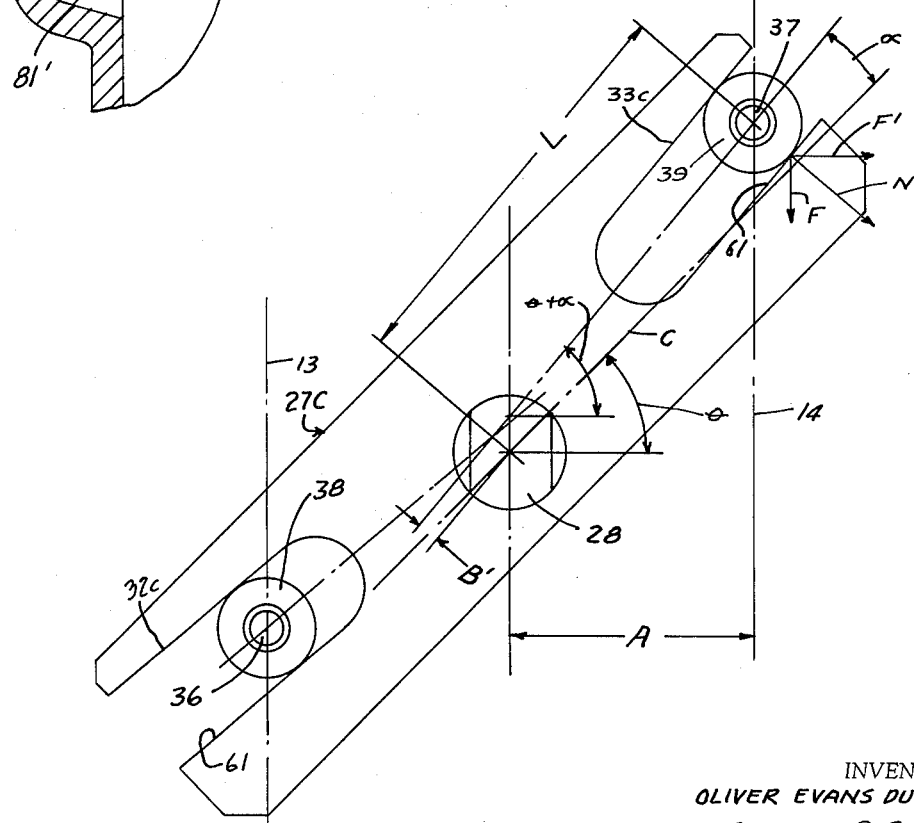
FIG-8-
INVENTOR.
OLIVER EVANS DUEMLER
BY Edward B Grey
ATTORNEY

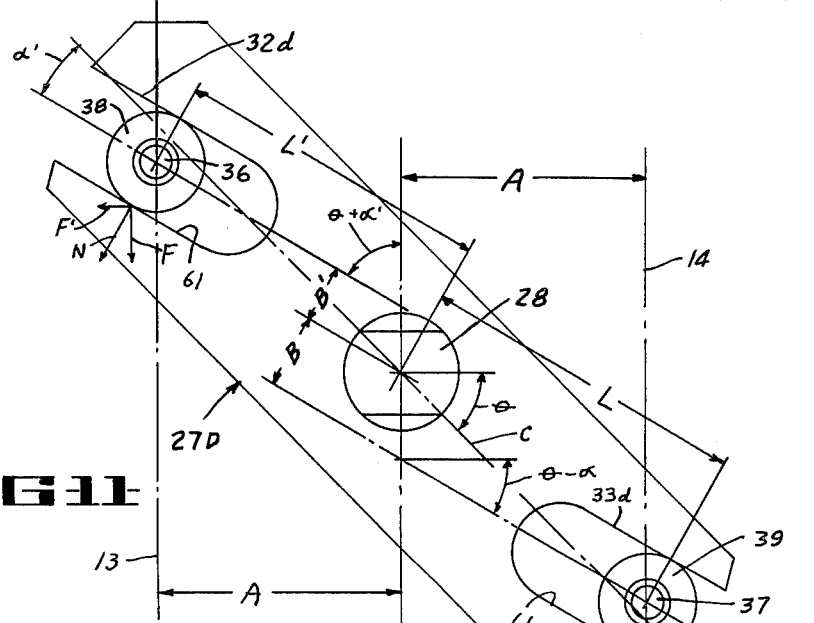
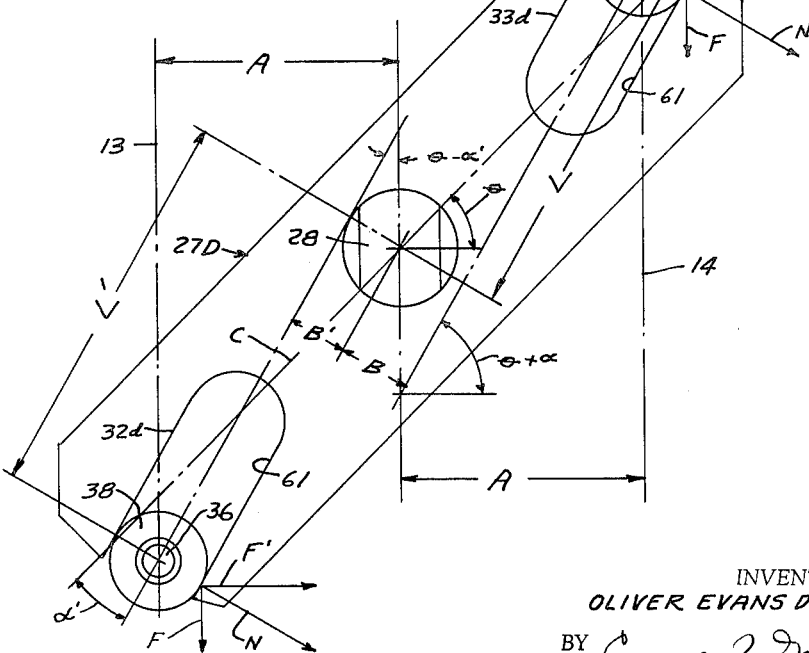
FIG 11
FIG 10
INVENTOR.
OLIVER EVANS DUEMLER
BY Edward B. Ney
ATTORNEY United States Patent Office 3,253,518
Patented May 31, 1966

3,253,518
PISTON OPERATOR
Oliver Evans Duemler, San Leandro, Calif., assignor to Grove Valve and Regulator Company, Oakland, Calif., a corporation of California
Filed Mar. 2, 1964, Ser. No. 348,603
7 Claims. (Cl. 92—68)

This invention relates to a valve operating mechanism and more particularly to a fluid pressure piston type operator for converting rectilinear piston motion to a rotary shaft motion for operation of a valve, or the like.

Various types of operators for valves which require rotation of a valve stem between two operating positions are well known and include, for example, hand operated gear, electric solenoid, and pressure operated piston mechanisms. In one type of piston operator, the axis of the piston, or pistons employed is displaced from the axis of the shaft, or stem, to be rotated, and a suitable arm interconnects the piston rod and valve stem for rotation of the stem upon linear movement of the piston within a cylinder. During operation, a radial force, having a magnitude dependent upon the torque of the valve stem, is developed at the piston rod. When large torques are required for actuation of the valve, large side loading forces are developed on the movable piston rod, and correspondingly large bearing arrangements are required to handle such loads. As a result, such operators are expensive, are of bulky construction and, unless sufficiently large bearings are employed, are incapable of withstanding such loads.

An object of this invention is the provision of a piston operator for converting between rectilinear and rotary motion in which side loading of the rectilinearly movable member is effected between the piston and cylinder wall.

An object of this invention is the provision of a piston operator for converting between rectilinear and rotary motion, which operator requires no expensive bearing arrangements for withstanding side loading of the rectilinearly movable member upon operation thereof.

An object of this invention is the provision of a piston type valve operator which is compact in size and economical to build.

An object of this invention is the provision of a piston type valve operator having independent valve opening and valve closing torque characteristics.

The above and other objects and advantages of the invention are obtained by means of an arrangement including a torque arm which interconnects a pair of pistons, adapted for rectilinear movement, with a shaft adapted for rotary movement. The torque arm is fixedly secured to the said shaft and slideably engages bearings carried by the pistons. The arrangement is such that side loading exists between the pistons and cylinder walls within which the pistons move during operation of the device, whereby the requirement for additional bearing arrangements to handle the side loading forces is eliminated. Also, since the connection between the one piston and torque arm is separate from the connection between the torque arm and the other piston, the operator may be designed with the desired torque characteristics for both the valve opening and valve closing operations.

In the drawings, wherein the same reference characters refer to like parts in the several views:

FIGURE 3 is similar to FIGURE 1 only showing the operator in a different operating condition;

FIGURES 4 and 5 are top views of a modified form of torque arm which may be used in the operator shown in FIGURES 1 to 3, in which arm the slots are set at an angle with the longitudinal axis of the arm, the torque arm being shown in two different operating positions in the drawings;

FIGURES 6 and 7 are similar to FIGURES 4 and 5, respectively, only showing the torque arm formed with slots parallel with but offset from the longitudinal axis of the arm;

Figure 1:
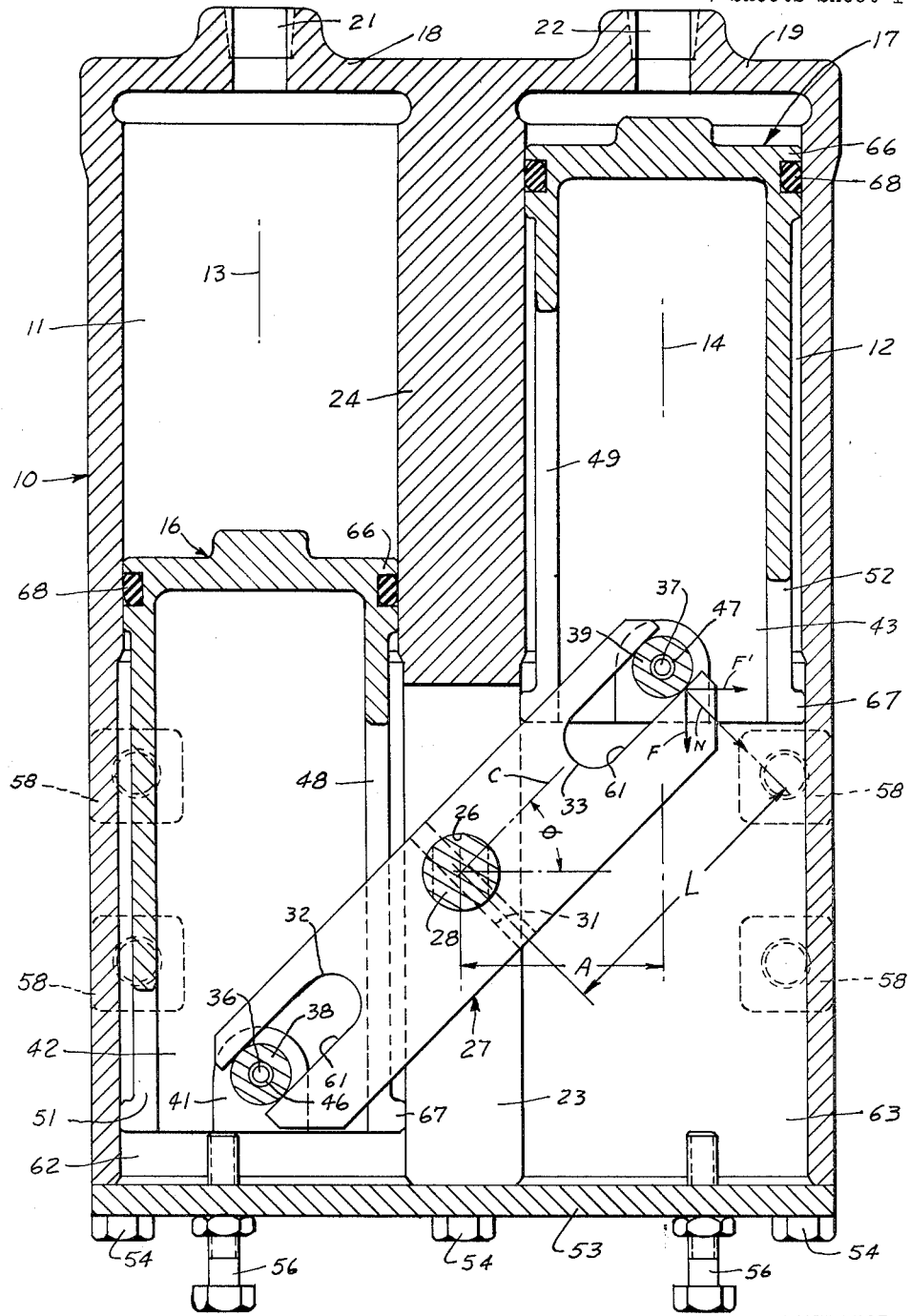
FIGURE 1 is a top view in cross section of a piston operator embodying this invention.

FIGURES 8 and 9 are top views of a further modified form of torque arm comprising a compromise between the design shown in FIGURES 4 and 5 and that shown in FIGURES 6 and 7; and FIGURES 10 and 11 are similar to FIGURES 4 and 5, respectively, only showing a still further modified form of torque arm.

Referring now to the drawings, the operator of this invention is shown comprising a generally rectangular-shaped body 10 with a pair of cylinders 11 and 12 formed therein, which cylinders face in the same direction and have parallel, side-by-side, axes designated 13 and 14, respectively. Pistons 16 and 17, of identical construction but provided with different reference numerals for purposes of identification and explanation, are located in the cylinders 11 and 12 and are adapted for reciprocating motion therewithin. The cylinders are formed with integral heads 18 and 19 at the ends thereof through which ports 21 and 22 are formed. A source of fluid pressure is adapted for connection to the cylinders through the port holes 21 and 22 through suitable valve means, not shown. It will be understood that when one cylinder is pressurized for actuation of the valve operator, the other cylinder is vented to permit movement of the inter-connected pistons within the cylinders. The mechanical inter-connection between the pistons, which forms a part of this invention, is described in detail hereinbelow.

A slot 23 is formed in the wall 24 between the cylinders 11 and 12 at the unpressurized end thereof, and a hole 26 is formed through the body at the slotted portion 23 and extends from the top to the bottom thereof. A torque arm 27 extends through the slot 23 into the cylinders 11 and 12 and is supported by a shaft, or rotary member, 28 which extends through and is rotatably supported in the hole 26 in the body. The shaft extends across the slot and is adapted for rotation about an axis transverse to the longitudinal axes 13 and 14 of the cylinders. The torque arm is secured to the shaft by a locking pin 31 which extends through holes formed in the arm and shaft. It will be apparent that rotation of the torque arm 27 in a plane perpendicular to the axis of the shaft 28 will rotate the said shaft.

The outer ends of the torque arm 27 are slotted, or bifurcated, as at 32 and 33 for engagement with the pistons 16 and 17 through piston pins 36 and 37 carrying bearings, or rollers, 38 and 39, respectively. It will be noted that oppositely facing and inwardly directed bosses 41 are formed on the pistons 16 and 17 adjacent the free ends of the piston skirts, designated 42 and 43, respectively, and the piston pins 36 and 37 extend through holes formed in each skirt through the bosses 41. The rollers 38 and 39 are rotatably supported with respect to the pins by means of sleeve bearing members 46 and 47 therebetween. The rollers 38 and 39 provide for a rotatable connection between the pistons and the torque arm. The invention, however, is not limited to such rotatable connection. For example, the bearings 38 and 39 could be round pins fixedly secured to the pistons for sliding contact between the pistons and torque arm, if desired. In another alternative construction, the bearings 38 and 39 may comprises rectangular blocks rotatably mounted on the pins 36 and 37 and slideably engageable with the torque arm 27 in the slots 32 and 33.

Elongated axial slots 48 and 49 are formed in the free end of the respective piston skirts 42 and 43 on facing sides, through which slots the torque arm 37 extends. At diagonally opposite sides of the piston skirts 42 and 43, there are formed similar, but shorter, slots 51 and 52, respectively, which provide clearance space for the free ends of the torque arm 27 during travel at and adjacent its center position as illustrated in FIGURE 3.

A cover 53 is secured by screws 54 to the body 10 to close off the ends of the cylinders. Stop members comprising screws 56 extend through tapped holes in the cover and into the ends of the cylinders 11 and 12 for engagement with the pistons 16 and 17 to thereby limit their travel. Lock nuts on the screws 56 may be tightened to fixedly secure the screws at desired stop positions.

Figure 2:
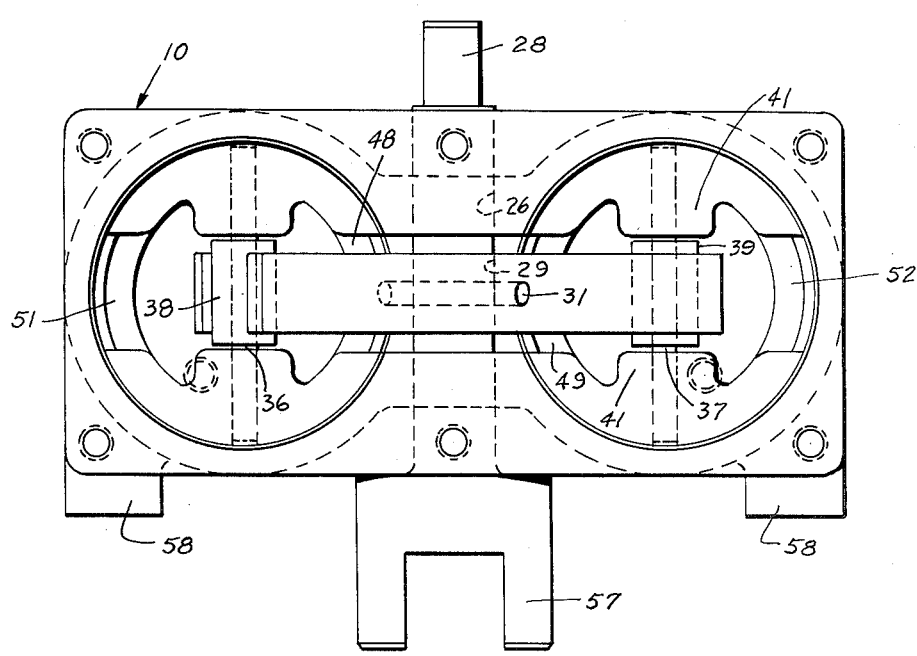
FIGURE 2 is an end view of the operator with the end cover plate removed therefrom to show the pistons, torque arm and associated elements.

In use as a valve operator, the bifurcated end 57 of the shaft 28 (as seen in FIGURE 2) is connected to the valve stem to be controlled, and the operator is mounted on the valve, or suitable supporting structure, by use of tapped bosses 58 on the body 10. The valve operator has two end operating positions, one of which is shown in FIGURES 1 and 2 wherein the pistons 16 and 17 are at the valve opening end of the stroke. In the valve closing position (not shown) the pistons 16 and 17 are at the opposite ends of their respective cylinders 13 and 14. (It will be understood that in operation the valve opening and closing positions could be reversed whereby the operating position shown in FIGURES 1 and 2 illustrates the valve closing end of the stroke, and the valve opening position obtains when the pistons are at the opposite ends of the cylinders.) For purposes of description, the end positions of the pistons may be termed the start and end positions. Thus, with the valve operator in the valve opening position, as illustrated in FIGURES 1 and 2, the piston 17 is in its start position while the piston 16 is in its end position. Conversely, at the valve closing position, the piston 16 is at its start position while the piston 17 is at its end position. When the operator is used to position a valve in either a fully open or closed position, the end operating positions comprise the normal operating positions of the actuator. Obviously, with proper control of fluid to the actuator, the actuator and attached valve may be positioned anywhere between such end positions for throttle use of the valve, the operator of this invention not being limited to any particular type of operation.

Travel between such end positions of the pistons results in the rotation of the shaft 28 through an angle of about 90 degrees. The operator is, therefore, adapted to operate a rotary valve such as a ball valve, plug valve, or butterfly valve which is rotated 90 degrees between fully open and fully closed positions. The adjustable stop members 56 mentioned above provide means for externally setting the end operating positions of the valve accurately after the operator is installed on the valve. Exact registry of the ports in the body of the valve and the rotatable plug or ball in the valve open condition is possible by simply adjusting one of the stop members 56. Adjustment of the other stop member provides means for setting of the closed position of the valve.

In order to rotate the shaft 28 clockwise through an angle of about 90 degrees as viewed in FIGURE 1, the cylinder 11 is vented through hole 21 and a source of fluid pressure is applied to the cylinder 12 through the hole 22. The roller 39 bears against the plane surface 61 of the torque arm 27 with a forward force. The only force, neglecting friction, that can be transmitted to the lever arm 27 is perpendicular to the side 61 of the slot 33, this force vector being designated N in the drawings. The vector force N comprises two components F and F', F being the piston force due to pressure in the cylinder 12 and F' being the reaction force, or side thrust, mechanically transmitted to the walls of the cylinder 12.

The force components F and F' add together vectorially to comprise the vector N which is perpendicular to the surface 61.

The longitudinal axis, or centerline, of the torque arm 27 passing through the pivot axis of the shaft 28 is designated by the reference character C in the drawings, and in FIGURE 1, the centerline of the slots 32 and 33 lie on the torque arm centerline C. The angle which the torque arm longitudinal axis C forms with a plane normal to the cylinder axes 13 and 14 through the pivot axis of the shaft 28 is designated $\theta$, and the distance between the pivot axis of the shaft 28 and the cylinder axes 13 and 14 is designated A (the distance A to only the one cylinder axis 14 being shown in FIGURES 1 and 3). In the construction illustrated in FIGURES 1 to 3, wherein the center line of the slots 32 and 33 extends along the torque arm centerline C, the angle $\theta$ also designates the angle which the surfaces 61 form with a plane normal to the cylinder axes 13 and 14. Also, the effective length of the lever or torque arm is designated by the reference character L.

Using the above designations, it will be seen from FIGURE 1 that the force N perpendicular to the side of the slot 33, the effective length of the torque arm L, and the torque T are given by the following equations:

$$N = \frac{F}{\cos \theta} \quad (1a)$$

$$L = \frac{A}{\cos \theta} \quad (1b)$$

$$T = F \frac{A}{\cos^2 \theta} \quad (1c)$$

The side thrust F' on the piston is given by the following equation:

$$F' = F \tan \theta \quad (1d)$$

If the operator, such as the operator of FIGURES 1 to 3, is designed so that the torque arm 27 travels 90° between angle $\theta = +45°$ and $\theta = -45°$ (the angle $\theta$ being considered positive when the torque arm is pivoted in one direction from the plane normal to the cylinder axes through the pivot axis of the shaft 28, as illustrated in FIGURE 1, and being considered negative when the torque arm is pivoted in the other direction from such plane, as illustrated in FIGURE 3). The theoretical torque at each end of the stroke is twice of what it is at the mid-position where angle $\theta = 0°$. This is seen from Equation 1c wherein with a constant force F on the cylinder, the torque is inversely related to the $\cos^2$ of the angle $\theta$. With $\theta$ equal to 45°, $$\frac{1}{\cos^2 45°}$$

equals 2, and with $\theta$ equal to 0°, $$\frac{1}{\cos^2 0°}$$

equals 1. This factor is reduced somewhat by increased friction at the ends of the stroke due to the side thrust F'.

As mentioned above, this type of operator is normally used with plug valves, butterfly valves and ball valves which turn approximately 90° between open and closed position. Some valves of this type require a high operating torque near the closed valve position only during both the valve opening and valve closing operations. Other valves require a high torque near full open position as well as near the closed position during both the valve opening and valve closing operations. A valve of this latter type would be a ball valve with the ball mounted on trunnions or bearings and with two seat rings which seal against pressure between the pipe line and the body space. A valve of this type may require the maximum torque when the pressure is in both the upstream and downstream connections and the body space is bled out, because of the force of the seat rings against the ball under such conditions. This condition can occur at either the fully opened or fully closed position. An operator as shown in FIGURES 1 to 3 is well suited to satisfy the requirements of this type of valve.

If the operator is to be used only with valves which have maximum torque near the closed position during both the valve opening and valve closing operations it may be desirable to make the maximum angle $\theta$ larger for the piston which opens the valve and smaller than 45° for the piston which closes the valve. For example, if the right hand piston 17 as viewed in FIGURE 1 were the one that opened the valve, the operator may be designed so that the torque arm would travel through an angle $\theta$ of from +50° to −40° or from +55° to −35°. By extending the one stop screw 56 further into the cylinder 12 and backing off the other stop screw 56 in the other cylinder 11, a small adjustment of the maximum positive and negative angle $\theta$ is possible with the illustrated arrangement of FIGURES 1 to 3. As mentioned above, however, the stop screws 56 are normally employed to set the end operating positions of the valve after the operator is installed on the valve. My invention is obviously not limited to the 90° travel between an angle $\theta = +45°$ and $\theta = -45°$ illustrated in FIGURES 1 to 3.

The force component F′ results in a side thrust, or loading, of the lower portion of the piston 17 against the cylinder 12. In the position shown in FIGURE 1 the side of the piston carrying the slot 49 is urged against the center dividing wall adjacent the slot 23 by such side loading which is large in the position illustrated in FIGURE 1. As the piston 17 moves from its start position the side loading force diminishes and reduces to zero when the torque arm 27 is normal to the cylinder axes 12 and 14, i.e., its center position in the illustrated construction of FIGURES 1 to 3. As the piston moves past the center position, the force component F′ reverses direction and increases in magnitude. As viewed in FIGURE 1, the direction of the force component F′ is to the right whereas, as viewed in FIGURE 3, the direction of the force component F′ is to the left. It will be apparent, therefore, that the side-loading between the piston and cylinder reduces to zero at the center condition of the operator and reverses direction as the piston moves past the center position. Thus, a side-loading force exists between the piston 17 and cylinder 12 adjacent the slot 52 during the remainder of the travel of the piston 17 from its center position to its end position in the cylinder, which force increases in magnitude as the position from the center rotary position increases. Rotation in the clockwise direction is limited by engagement of the piston 17 with the screw stop 56 extending into the cylinder 12.

During travel of the piston 17 when the cylinder 12 is pressurized, the piston 16 is moved by engagement between the torque arm 27 and bearing 38 carried by the piston 16. To rotate the shaft 28 back to the position illustrated in FIGURE 1, the cylinder 11 is connected to a source of fluid pressure and the cylinder 12 vented. The return operation is the same as described above except the piston 16 provides the motive force for the torque arm 27, rather than the piston 17.

It will be noted that a positive, but rotatable, connection is provided between each end of the torque arm 27 and its respective piston (the positive connection being provided by operation of the rollers 38 and 39 in the slots 32 and 33 formed in the torque arm). Such positive connections, however, are not necessary to operation of the device. For example, the rollers 38 and 39 could bear against the torque arm 27 adjacent the ends thereof, without a positive connection and the device could nevertheless operate under power. If, however, the shaft 28 were operated manually (which is sometimes desired, e.g., when there is a power failure) both pistons would not follow the torque arm 27. If, for example, the shaft 28 were manually rotated clockwise from the position illustrated in FIGURE 1, the piston 17 would not follow the torque arm 27. If the cylinder 12 was then pressurized, in this condition of the operator, the piston 17 would travel a distance before striking the torque arm and, as a result, the device could be damaged. By positively interconnecting the pistons and torque arm, both pistons are moved upon manual rotation of the shaft 28 in either direction. To permit said manual rotation of shaft 28, it is obvious that both cylinders 11 and 12 must be vented.

As mentioned above, when large torques are required to rotate the valve stem to which the shaft 28 is connected, large side loading forces are developed. With prior art constructions, large bearings were included for withstanding such forces. With the apparatus of this invention, however, the large side forces are developed between the piston and cylinder and no additional bearings arrangements are required. Not only are the side thrust, or loading, forces F′ carried by the pistons, but the forces are developed, primarily, at the unpressurized ends of the pistons. As described below, piston sealing means for sealing the pistons with the cylinders are located adjacent the pressurized ends of the pistons, therefore, most of the piston and cylinder wear produced by the side loading forces is along a portion of the cylinders remote from that portion in which the pistons are sealingly engaged. As a result, an increase in operator life is provided.

The illustrated arrangement further includes a novel piston and cylinder construction which is particularly adapted for use in a valve operator. As seen in FIGURE 1, the cylinders are not of a uniform bore. Instead, the ends of the cylinders 11 and 12, opposite the cylinder heads 18 and 19, and designated 62 and 63, respectively, are of an enlarged diameter. The pistons 16 and 17 are formed with different diameter flanges, or lands, 66 and 67 adjacent the upper and lower ends thereof for operation in the different bore sections of the cylinders. An annular groove is formed in each land 66 within which an O-ring 68 is located for sealing engagement between the piston and cylinder. Other types of seal may be used such as cups, U-cups, chevron rings, solid packings or combinations thereof. In operation, the upper end of the pistons reciprocate in the reduced diameter portion of the cylinders while the lower end of the pistons reciprocate in the enlarged diameter lower portion thereof.

An advantage of such a construction is that the O-rings are not damaged by the slotted portion of the cylinders during assembly of the pistons therein, since the slot 23 is located at the enlarged diameter portion of the cylinders and does not extend into the reduced diameter region. If the cylinders were of a uniform bore, the O-rings 68 could possibly be damaged while being slid past the slotted portion of the cylinders. In addition, a larger bearing surface between the lands 67 and the cylinder walls is provided by use of the enlarged diameter lower end portion, whereby the operator is capable of withstanding somewhat larger side loading forces than would be possible with a uniform bore construction. It will be apparent, however, that if the operator is formed with uniform diameter cylinders, the pistons too may be of a uniform diameter, if desired, since there would then be no requirement for an enlarged diameter at the lower end of the piston.

With the novel valve operator construction of this invention, which includes separate connections between the pistons and the torque arm, the operator may be designed for different torque characteristics for the valve opening and valve closing operations to accommodate the torque characteristics of the valve to be controlled. Alteration of the torque characteristics of the operator involves, primarily, changing the angle and/or location of the slots 32 and 33 in the torque arm 27. Several modified forms of torque arms are shown in FIGURES 4 to 11 and described below. Referring to FIGURES 4 and 5, there is shown a torque arm, designated 27A, having slots 32a and 33a which are formed at an angle with the longitudinal axis of the torque arm, with the extended centerlines of the slots forming a generally V-shape. In FIGURES 4 and 5, α designates the angle between the centerline or longitudinal axis C of the torque arm and the centerline of the slot 33a. The angle θ, as defined above, comprises the angle between the longitudinal axis C of the torque arm and the plane through the pivot axis of the shaft 28 normal to the cylinder axes 13 and 14. The sum of the angles θ+α, therefore, equals the angle which the surface 61 forms with the plane normal to the cylinder axes 13 and 14, as seen in FIGURE 4. The reference character B is the distance which the axis of the slot 33a is offset from the pivot axis of the shaft 28 measured along a normal from the slot axis through the said pivot axis. (Where a slot axis extended passes the other side of the pivot axis of the shaft 28, such as in FIGURES 6 to 11, the reference character B' is used to designate the above-defined offset distance.) In the specification and claims, the term "offset distance" designates the distance B or B' shown in the drawings.

For an operator employing the torque arm 27A of FIGURES 4 and 5, the force N perpendicular to the side 61 of the slot 33a, the effective length of the torque arm L, and the torque T are given by the following equations:

$$N = \frac{F}{\cos(\theta+\alpha)} \qquad (4a)$$

$$L = \frac{A - B \sin(\theta+\alpha)}{\cos(\theta+\alpha)} \qquad (4b)$$

$$T = F\frac{A - B \sin(\theta+\alpha)}{\cos^2(\theta+\alpha)} \qquad (4c)$$

The side thrust F' on the piston is given by the following equation:

$$F' = F \tan(\theta + \alpha) \qquad (4d)$$

An important factor in the operation of plug valves, butterfly valves and ball valves with which this type of valve operator is normally used, is the "break-out" torque, i.e., the torque required to overcome static friction. This is usually present to a certain extent even with frequently operated valves and may become fairly large with valves which have set in one position for a long period of time. With the slots 32a and 33a in the torque arm 27A set at the angle shown in FIGURES 4 and 5, the operator will produce additional torque at the start of the stroke to compensate for the "break-out torque." With this arrangement, the increased torque occurs at the start of the operation regardless of whether the valve is going from closed to open or from opened to closed. The torque at the end of the stroke is correspondingly reduced a certain amount under the design shown in FIGURES 1 to 3. This design is very suitable for valves which require a high torque near the open position as well as near the closed position during the initial portion of the opening and closing strokes.

It will be noted from Equation 4d that the side thrust F' at the start of the stroke is larger for this design than it is for the design shown in FIGURES 1 to 3, if it is assumed that θ has the same maximum value (say 45°) in each case. F' is less at the end of the stroke than it is in the design shown in FIGURE 1.

It will be further noted from a comparison of Equations 1c and 4c that the offset, B, of the slot centerline reduces the maximum torque obtained at the start of the stroke but this is more than offset by the effect of the angle α. If the centerline of the slot were not offset the distance B, the torque arm would be longer and would not clear the side of the bore 63 when it is in the mid-stroke position.

Another method of increasing the torque at the beginning of the stroke for both closed to open and opened to closed operation is to leave the slots parallel with the centerline of the torque arm but offset from the centerline of the shaft 28 toward the pressurized end of the cylinders. A torque arm, designated 27B, of this design is shown in FIGURES 6 and 7. The force N perpendicular to the side of the slot, the effective length of the torque arm L, and the torque T are given by the following equations:

$$N = \frac{F}{\cos \theta} \qquad (6a)$$

$$L = \frac{A + B' \sin \theta}{\cos \theta} \qquad (6b)$$

$$T = F\left(\frac{A + B' \sin \theta}{\cos^2 \theta}\right) \qquad (6c)$$

The side thrust F' on the piston (which is principally taken by the band or flange 67 on the piston rubbing against the side of the bore of the cylinder) is given by the following equation;

$$F' = F \tan \theta \qquad (6d)$$

It will be noted that in the design of FIGURES 6 and 7, the side thrust F' is identical with the side thrust of the design of FIGURES 1 to 3 and is not increased as with the design of FIGURES 4 and 5. The increased torque is obtained from the increased effective lever arm L. With this design it is necessary to provide pockets or recesses in the sides of the cylinder bores to allow the torque arm to pass through the mid-position, one such pocket designated 81 being shown in FIGURE 7. In place of a pocket, the cylinders could be slotted, if desired, to accommodate the torque arm. Also, the length of the cylinder bores must be increased to provide clearance at the end of the stroke. Under many conditions, the design of FIGURES 4 and 5 is simpler and is preferred over the design of FIGURES 6 and 7. However, with certain materials of construction and with certain operating conditions there may be excessive wear or friction between the bands or flanges 67 and the cylinder bores, in which case the construction of FIGURES 6 and 7 may be preferred.

Reference is now made to FIGURES 8 and 9 wherein there is shown a torque arm 27C which comprises a compromise between the design shown in FIGURES 4 and 5 and that shown in FIGURES 6 and 7. With the torque arm 27C the extended center lines of slots 32c and 33c form a shallower V-shape than that of the arm 27A in FIGURES 4 and 5, and the offset distance B' for the arm 27C is less than that for the arm 27B in FIGURES 6 and 7. The force N, torque arm L, torque T and side thrust F' equations for this design are:

$$N = \frac{F}{\cos(\theta+\alpha)} \qquad (8a)$$

$$L = \frac{A + B' \sin(\theta+\alpha)}{\cos(\theta+\alpha)} \qquad (8b)$$

$$T = F\frac{A + B' \sin(\theta+\alpha)}{\cos^2(\theta+\alpha)} \qquad (8c)$$

$$F' = F \tan(\theta+\alpha) \qquad (8d)$$

With this design, somewhat shallower pockets 81' are required in the cylinders for the torque arm than are required with the design of FIGURES 6 and 7 (only one pocket 81' being shown in FIGURE 7).

Reference is now made to FIGURES 10 and 11 wherein there is shown a torque arm designated 27D which is similar to that shown in FIGURES 4 and 5 except that the angle of the slot on the left end of the torque arm is reversed. This design is most suitable for a valve which requires a high torque at one extreme position but not at the other. With this torque arm, the right hand piston provides a maximum torque at the beginning or start of its stroke, whereas the left hand piston provides maximum torque at the end of its stroke. The equations for the left hand piston are identical with those for the right hand piston if the angle α' and the distance B' are considered negative quantities. The equations for the right hand side are given by the Equations 4a through 4d, and the equations for the left hand piston are as follows:

$$N = \frac{F}{\cos(\theta - \alpha')} \quad (10aL)$$

$$L' = \frac{A + B' \sin(\theta - \alpha')}{\cos(\theta - \alpha')} \quad (10bL)$$

$$T = F \frac{A + B' \sin(\theta - \alpha')}{\cos^2(\theta - \alpha')} \quad (10cL)$$

$$F' = F \tan(\theta - \alpha') \quad (10dL)$$

Obviously, the slots in the torque arm of the operator may be formed with any desired offset B or B' and at any desired angle α or α' within a wide range of distances and angles. Also, any combination of right and left hand slots may be employed to obtain the desired torque characteristics for valve opening and valve closing operations.

The invention having been described in detail in accordance with the requirements of the patent statutes, various other changes and modifications will suggest themselves to one skilled in this art. It is intended that such changes and modifications shall fall within the spirit and scope of the invention as recited in the following claims.

I claim:

1. A valve actuator comprising: first and second cylinders arranged in side-by-side, parallel relation and facing in the same direction, said cylinders having port means at adjacent ends for inflow and outflow of an operating fluid; a first piston reciprocable in said first cylinder and a second piston reciprocable in said second cylinder, each said piston being reciprocable between a start position closest to its respective port means and an end position furthest from its respective port means; a rotary member disposed between said cylinders and pistons to rotate about an axis transverse to the longitudinal axes of said cylinders; a torque arm having a first end and a second end, said torque arm being affixed to said rotary member intermediate its ends whereby rotation of said torque arm in a plane perpendicular to the axis of said rotary member will rotate said rotary member, and slot means in the first end of said torque arm engaging complementary means on said first piston and slot means in the second end of said torque arm engaging complementary means on said second piston, said port means and the connections of said torque arm with said pistons being so arranged that, when the first piston is in its start position the second piston is in its end position and, as operating fluid under pressure is admitted to the first cylinder, the first piston moves to its end position and the second piston is moved by said torque arm to its start position, such movements being reversed upon admission of operating fluid pressure to said second cylinder; the connections between said torque arm and piston being such that the distance between each such connection and the axis of said rotary member is a minimum at a point intermediate the start and end positions of travel of the respective pistons, each of said pistons comprises a piston head of relatively short axial length, seal means around said piston head, a skirt of reduced diameter depending from said piston head, and enlarged diameter portions of short axial length forming thrust bearing members at the lower end of said skirts, said thrust bearing members being disposed at approximately the level of said complementary engaged means and being in slidable engagement with opposite walls of the cylinders to transmit said thrust of said engaged means to first one of said opposite walls and then, when said torque arm reaches said intermediate point, to the other of said opposite walls.

2. The valve actuator as recited in claim 1 wherein the longitudinal axes of the first and second slots formed in the torque arm are parallel to each other and form an angle with the longitudinal axis of the torque arm.

3. The valve actuator as recited in claim 1 wherein the extended longitudinal axis of at least one of the slots formed in the torque arm is offset from the pivot axis of the rotary member and forms an angle with the longitudinal axis of the torque arm.

4. The valve actuator as recited in claim 1 wherein said bearing members are of larger diameter than said piston head, and the said cylinders are provided with enlarged diameter bores adjacent the end opposite the cylinder heads within which the enlarged diameter bearing members ride.

5. The valve actuator defined by claim 1 including:
means forming slots through said thrust bearing members and skirts at adjacent sides of said pistons through which the ends of said torque arm extend to engage said complementary means.

6. A valve actuator comprising: a rotary member, means connecting the rotary member to a valve operating shaft, a torque arm affixed to said rotary member intermediate its ends whereby rotation of said torque arm in a plane perpendicular to the axis of said rotary member will rotate said rotary member, first and second slots formed in opposite ends of the torque arm, at least one of said first and second slots being offset from the pivot axis of the rotary member and forming an angle with the longitudinal axis of the torque arm, reciprocably movable first and second drive members engaged in the respective first and second slots in the torque arm, means guiding said drive members along parallel paths transverse to the axis of said rotary member, each said drive member being reciprocable between a start position and an end position, means for applying a force selectively to said drive members to drive the same between the start and end positions, the side thrust of said connections being transmitted to the guide means through the drive members, the function of torque output versus rotary member position for one direction of rotation of the rotary member being dependent upon the disposition of said first slot in the torque arm, and the function of torque output versus rotary member position for rotation of the rotary member in the opposite direction being dependent upon the disposition of said second slot in the torque arm.

7. The valve actuator defined by claim 6 wherein the longitudinal axes of the first and second slots are parallel to each other and form an angle with the longitudinal axis of the torque arm.

References Cited by the Examiner

UNITED STATES PATENTS

| | | | |
|---|---|---|---|
| 1,580,249 | 4/1926 | Hornor | 92—138 |
| 2,036,237 | 4/1936 | Sibbe | 60—52 |
| 2,111,594 | 3/1938 | Kuzelewski | 60—52 |
| 2,234,008 | 3/1941 | Price | 60—54.6 |
| 2,643,677 | 6/1953 | MacLean | 92—68 |
| 2,948,266 | 8/1960 | Gratzmuller | 91—186 |
| 3,104,592 | 9/1963 | Sheesley | 92—13 |

FOREIGN PATENTS

| | | |
|---|---|---|
| 972,346 | 8/1950 | France. |
| 276,546 | 9/1927 | Great Britain. |

SAMUEL LEVINE, *Primary Examiner.*

H. G. SHIELDS, I. C. COHEN, *Assistant Examiners.*